(12) United States Patent
Demidov

(10) Patent No.: US 12,271,773 B2
(45) Date of Patent: Apr. 8, 2025

(54) RADIO FREQUENCY IDENTIFICATION SHEET MATERIAL (VARIATIONS)

(71) Applicant: RFID PAPER SDN BHD, Johor (MY)

(72) Inventor: Ivan Sergeevich Demidov, Zelenograd (RU)

(73) Assignee: RFID PAPER SND BHD, Johor Bahru (MY)

( * ) Notice: Subject to any disclaimer, the term of this patent is extended or adjusted under 35 U.S.C. 154(b) by 293 days.

(21) Appl. No.: 17/618,305

(22) PCT Filed: Sep. 20, 2019

(86) PCT No.: PCT/RU2019/000660
§ 371 (c)(1),
(2) Date: Dec. 10, 2021

(87) PCT Pub. No.: WO2020/251395
PCT Pub. Date: Dec. 17, 2020

(65) Prior Publication Data
US 2022/0309301 A1    Sep. 29, 2022

(30) Foreign Application Priority Data
Jun. 14, 2019 (RU) .......................... RU2019118539

(51) Int. Cl.
*G06K 19/063*     (2006.01)
*G06K 19/077*     (2006.01)

(52) U.S. Cl.
CPC ..... *G06K 19/063* (2013.01); *G06K 19/07722* (2013.01); *G06K 19/07749* (2013.01)

(58) Field of Classification Search
CPC ........... G06K 19/063; G06K 19/07722; G06K 19/07749
See application file for complete search history.

(56) References Cited

U.S. PATENT DOCUMENTS

| 9,626,617 B2 | 4/2017 | Martin et al. | |
| 2011/0298574 A1* | 12/2011 | Sato | H01Q 1/2208 336/84 C |
| 2013/0215162 A1* | 8/2013 | Gokita | G07C 1/10 377/24 |

FOREIGN PATENT DOCUMENTS

| GB | 2236279 A | * 4/1991 | ........... G06K 13/063 |
| JP | S59140585 A | 8/1984 | |
| JP | 2009282900 A | * 12/2009 | |
| JP | 2011008567 A | * 1/2011 | |
| JP | 2012024709 A | * 2/2012 | |

(Continued)

*Primary Examiner* — Laura A Gudorf
(74) *Attorney, Agent, or Firm* — Maschoff Brennan

(57) ABSTRACT

The group of inventions relates to the field of radio-frequency identification, in particular, to materials containing radio-frequency tags in their layers and intended for printing and stamping by commonly available printing methods. The technical result is the creation of the technical solution as an alternative to the known one. The sheet material with the radio frequency identification is characterized by the fact that it is made in the form of a rectangular paper sheet with a length of 450-485 mm, width of 300-330 mm (according to the first variant) and a length of 700-750 mm, width of 500-530 mm (according to the second variant), and it contains an antenna and a chip located inside the sheet, what's more, one of the corners of the sheet is made geometrically different from three other corners.

17 Claims, 3 Drawing Sheets

(56) References Cited

FOREIGN PATENT DOCUMENTS

Figure 1:
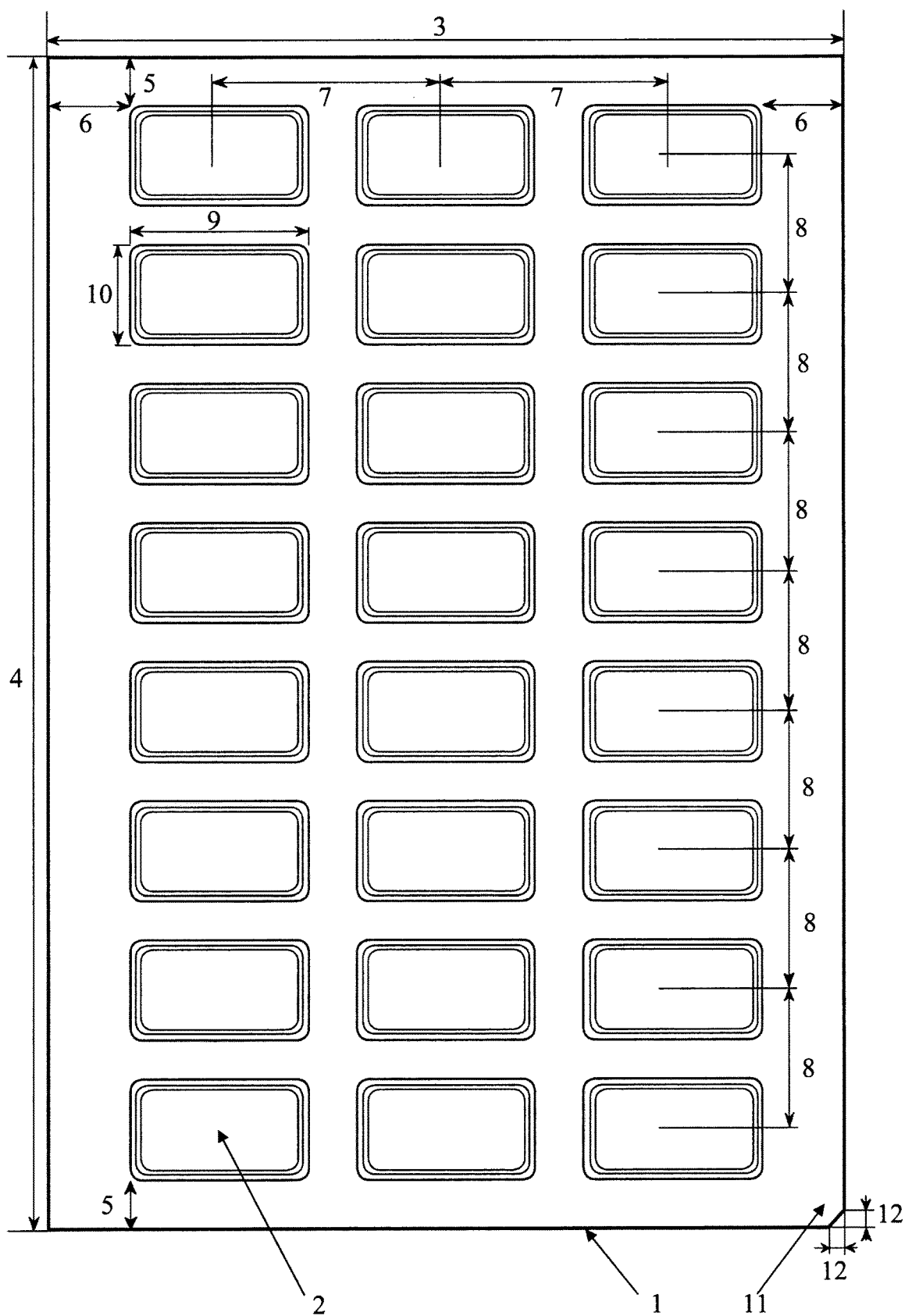

| WO | 2009071068 | A2 | 6/2009 |
|----|------------|----|--------|
| WO | 2010007287 | A1 | 1/2010 |
| WO | 2013098518 | A1 | 7/2013 |

* cited by examiner

RADIO FREQUENCY IDENTIFICATION SHEET MATERIAL (VARIATIONS)

The group of inventions relates to the field of radio-frequency identification, in particular, to materials containing radio-frequency tags in their layers and intended for printing and stamping by commonly available printing methods.

The following terms and abbreviations will be used hereinafter.

Radio frequency identification (abbr. RFID) is a method of transmitting wireless information in which the data stored in so-called transponders or RFID tags by means of radio signals are read or written. Generally, the RFID tags are passive, in other words, they do not include batteries.

Chip—an integrated (micro)circuit is a microelectronic device with input resistances and/or building networks made of the semiconductor plate. The chip processes signals when receiving and transmitting information by means of the radio frequency communication with a reader. The processor contains a protected memory, user memory, a unique identification number. The processor may contain a processor for cryptography processing, programmable space to run microprograms, etc.

The antenna is a conductor configuration, which geometrically and technically is made in accordance with the type of chip used. The antenna can be closed (HF range) and open type (UHF range). The antenna comes in different shapes: the circle, oval, square, rectangle, and other free geometric shapes. The antenna's shape is designed in accordance with the specification of the chip used. The antenna is made of materials containing conductive substances, such as aluminum, copper, silver, tin, gold, graphite, and other materials. The antenna is to be applied on the substrate made of thin-film, synthetic materials, and paper by etching, silk screen printing (screen printing), thermal transfer, stamping, inkjet, offset, as well as flexographic and digital printing with special inks.

The RFID inlay is a part of the RFID product that consists of the substrate and contains at least one chip and one antenna. The location of the antennas and chips can be either synchronous relative to the sides of the sheet material with the radiofrequency tag or asynchronous, depending on the intended design and configuration of the future RFID product. The additional components can be located on the inlay, for example, capacitors, resistors, sensors, microcontrollers, etc.

The RFID tag is a combination of the chip and antenna.

The RFID product is a final product, containing an RFID tag, for example, a card, tag, label, sticker, packaging, bracelet, or other forms of the product that can be obtained by cutting it from the sheet of RFID material that includes an RFID inlay.

The RFID reader is a device designed to exchange data with RFID products, for example, information reading and writing.

The closest group of claimed inventions analog is a sheet material with radio frequency identification, known from patent JP 5916028, which is a paper of standardized sizes formats A0-A10, B0-B10, as well as Japanese paper size formats (JIS).

The expansion of the sheet materials arsenal is a technical problem the group of inventions aimed to solve.

The technical result is the creation of a technical solution as an alternative to the known solution.

The claimed technical solution makes it possible to produce a sheet material suitable for commercial printing with a sheet feed, including the modern digital presses HP Indigo, Canon ImagePress, Konica Minolta AccurioPRESS, Ricoh Pro, Xerox iGen 5, and others.

The claimed technical result is achieved due to the fact that the sheet material with radio frequency identification is made in the form of a rectangular sheet with a layer for printing, having a length of 450-485 mm and a width of 300-330 mm. The sheet material contains an antenna and a chip located inside the sheet. Furthermore, one of the sheet corners is made as geometrically different from three other corners.

The claimed technical result is also achieved due to the fact that the sheet material with radio frequency identification is made in the form of a rectangular sheet with the layer for printing, having length of 700-750 mm, and a width of 500-530 mm. The sheet material contains an antenna and a chip placed inside the sheet. Furthermore, one from the corners of the sheet is made as geometrically different from three other corners.

Figure 2:
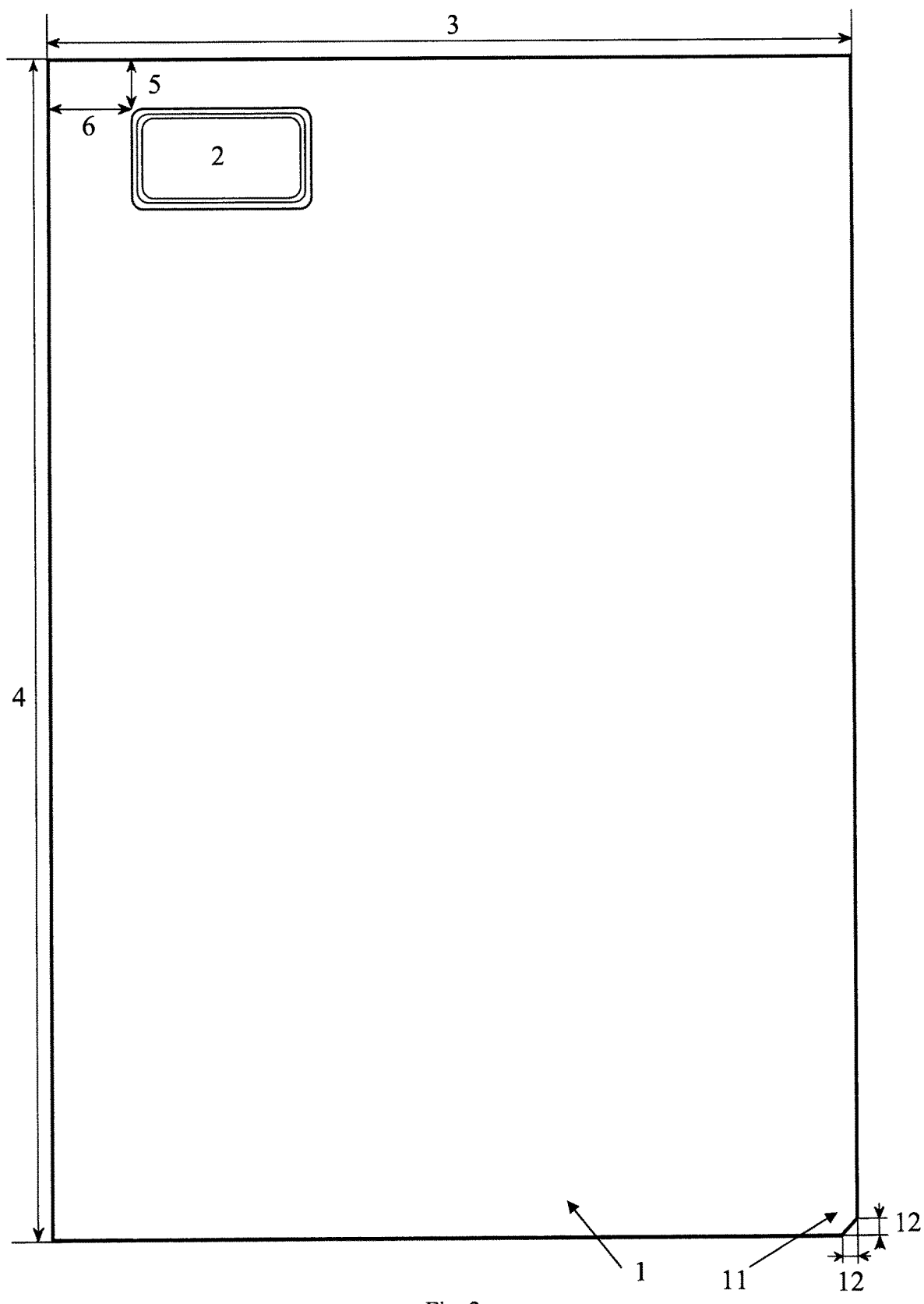
Figure 3:
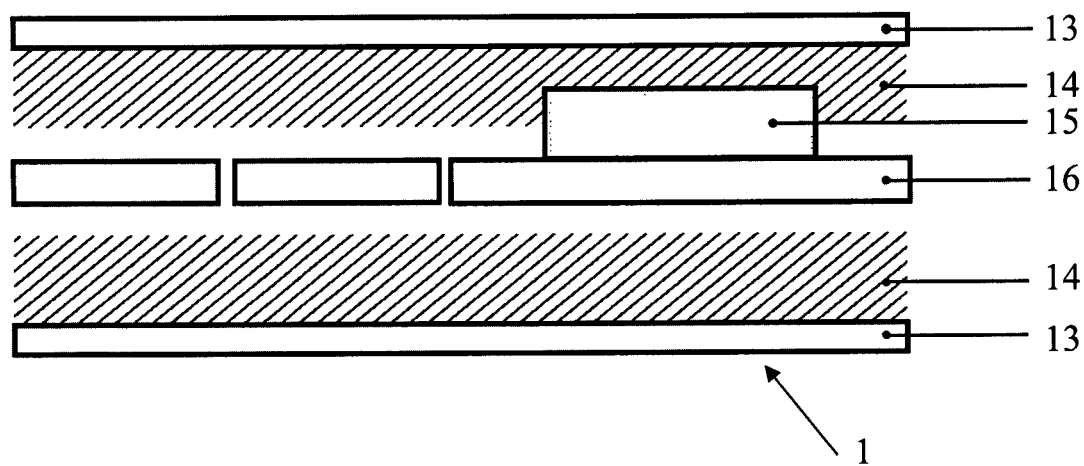

The inventions group is explained using FIG. 1-3, which shows:

FIG. 1 is a general view of sheet material with twenty-four radio frequency tags;

FIG. 2—general view of the sheet material with one radio frequency tag;

FIG. 3—layer material sectional view.

Positions 1-16 are shown in FIG. 1-3:
  1—sheet material;
  2—the place of the radio frequency identification tag (RFID tag);
  3—the smaller side of the sheet;
  4—the larger side of the sheet;
  5—the distance from the smaller side of the sheet to the antenna;
  6—the distance from the large side of the sheet to the antenna;
  7—the distance between the centers of the adjacent antennas located horizontally;
  8—the distance between the centers of the adjacent vertically located antennas;
  9—antenna length;
  10—antenna width;
  11—geometrically different corner;
  12—beveled corner size;
  13—printing layer;
  14—synthetic plastic adhesive layer;
  15—chip;
  16—antenna.

The sheet material with the radio frequency identification, according to the first variant, is made in the form of rectangular sheet 1 with a length of 450-485 mm—the large side of sheet 4—and a width of 300-330 mm—the smaller side of sheet 3, while one corner 11 of the sheet is made to be geometrically different from the three other corners.

The sheet material with radio the frequency identification, according to the second variant, is made in the form of the rectangular sheet 1 with a length of 700-750 mm—the large side of the sheet 4—and a width of 500-530 mm—the smaller side of the sheet 3, while one corner 11 of the sheet is made to be geometrically different from the three other corners.

Geometrically different corner 11 is a positional corner and it ensures the correct location of the sheet at various stages of the final product production by printing plants: typing, stamping, and die-cutting. The position corner, in contrast to a graphically plotted angle, is more convenient and universal, as it allows to check the correct location of the sheet in the middle of a stack. The position corner can be made with a bevel, for example, 3-50 mm in size or at an angle, for example, 10-80°, including 45°. The position corner can be made in the form of a fillet or a notch, for example, a semicircular, triangular or rectangular shape. The position corner can be made in any other way, which makes it possible to determine the correct position of the sheet in the bundle.

The device is a sandwich structure (FIG. 3), in which the first layer for printing 13, the layer of synthetic plastic adhesive 14, the chip 15 (not shown in FIG. 1), the layer with the antenna 16 on the substrate, the second layer of the synthetic plastic adhesive composition 14, the second layer for printing 13. Printing layer 13 can be made of offset, craft or recycled paper, cardboard, synthetic paper, represents the PET (Polyethylene terephthalate), PVC (Polyvinyl chloride), PP (Polypropylene), PE (Polyethylene), natural or synthetic fabric, the artificial leather on the basis of PVC (Polyvinyl chloride) or PU (Polyurethane), or the layer of another suitable material. The sheet material can be either white or painted in any color; have markings, patterns or inscriptions; have a textured surface or additional coating, including a primer, which provides better retention of paint on the surface.

The substrate where antenna 16 and chip 15 are located can be made, for example, of PET, special paper, or another suitable flexible material. Antenna 16 can be made by means of etching or aluminum sputtering, alloys based on copper, silver, tin, gold, graphite, or other conductive materials suitable for chip 15's operation.

MIFARE Ultralight C, MIFARE Ultralight EV1, MIFARE Ultralight Nano, NTAG 215, NTAG DNA, ICODE SLIX 2, UCODE 8, UCODE DNA, and others can be used as chip 15.

As such, antenna 16 and chip 15 are placed inside sheet 1.

Antenna 16, in this particular case, is made in a rectangular form and has a length of 10-100 mm and a width of 10-70 mm. What's more, in this example, distance 5 from the smaller side of the sheet to the edge of the antenna 16 is 10-30 mm, while distance 6 from the larger side of the sheet to the edge of the antenna 16 is 30-40 mm.

Antenna 16 can be made as a round shape and has a radius of 15-60 mm, as well as a square shape with a side length of 15-60 mm or any other suitable shape.

Depending on the purpose, more than one antenna 16 with a chip 15 can be located in the sheet. Twenty-four RFID tags, which respectively comprise twenty-four antennas 16 on the substrate, are shown in FIG. 1. In this case, distance 7 between the centers of adjacent horizontally located antennas 16 is 80-100 mm, and distance 8 between the centers of adjacent vertically arranged antennas is 50-60 mm. In general, there can be from 1 to 150 RFID tags, for example, 1, 2, 4, 8, 16, 24, 25, 36, 48, 50, 72, while the positioning and geometry of the antennas and chips are determined by the future shape of the final product.

LEDs, sensors, transducers, thin-film batteries, and other electronic components can also be placed inside sheet 1.

Positional elements can be located inside the sheet, whereby the induction sensors find the location of the RFID tags for positioning the sheet during printing, cutting, or other necessary operations in punching and other printing machines. The resulting sheet thickness varies from 0.15 mm to 1.0 mm.

The machine-readable unique sheet number can be applied on each sheet, for example, the barcode, QR code, and other graphic elements. The tags located on the RFID sheet are linked by this number. When forming a print file, the unique numbers of RFID tags located inside the sheet material are known to the printing house in advance, which makes it possible to print this information in one pass, thereby avoiding additional manipulations for reading data from RFID tags and their subsequent additional application of graphics to RFID products.

After printing, the sheet material with radio frequency identification can be further processed, for example, partial foil stamping, varnishing, application of laminating films based on BOPP (biaxially oriented polypropylene film), PVC, PET.

The sheet material with radio frequency identification can have a front and back side made of one or different grades and colors of paper, or contain the paper on one side and synthetic material on the other side, fabric, or have a siliconized layer on one side and other combinations, including those containing the metallized layers, magnetic layers, and other materials.

The sheet 1 is shown in FIG. 1 with a size of 325 mm by 480 mm with a geometrically different corner of 10 mm by 10 mm made at a 45° angle.

The sheet material is used as follows.

The sheet material is to be placed in the equipment for printing images. The bevel of one of the corners 11 is necessary for the sheet material positioning when printing. The sheet material is placed in the machine for subsequent high-precision cutting of products of various shapes or other processing (folding, embossing, embossing, etc.) after printing.

The claimed sheet material can be used to produce classic paper cards with an RFID tag: transport cards, key cards (Skipass, hotel, office), parking cards, labels, tags, postcards, packages, stickers, and other similar products containing the RFID tag inside.

The invention claimed is:

1. A sheet material for radio frequency identification (RFID), comprising:
   a rectangular sheet including:
      a layer for printing,
      an antenna, placed inside the sheet, and
      a chip, placed inside the sheet,
         wherein one corner of the sheet is geometrically different from three other corners of the sheet, the geometrically different corner being rounded; and
   a plurality of positional elements located inside the sheet, the positional elements being usable for locating a plurality of RFID products during an operation selected from printing, cutting, and punching of the sheet material,
   a thickness of the sheet material varying between 0.15 mm and 1.0 mm according to locations of the plurality of positional elements.

2. The sheet material of claim 1, wherein the geometrically different corner is made with a bevel.

3. The sheet material of claim 1, wherein the geometrically different corner is made with a bevel with dimensions of 3-50 mm.

4. The sheet material of claim 1, wherein the geometrically different corner is made with a bevel at an angle of 10-80°.

5. The sheet material of claim 1, wherein the geometrically different corner is made with a recess.

6. The sheet material of claim 1, wherein the rectangular sheet includes more than one antenna and more than one chip.

7. The sheet material of claim 1, wherein the rectangular sheet includes one or more additional electronic components.

8. The sheet material of claim 1, wherein the rectangular sheet has a length of 450-485 mm and a width of 300-330 mm.

9. The sheet material of claim 1, wherein the rectangular sheet has a length of 700-750 mm and a width of 500-530 mm.

10. The sheet material of claim 7, wherein the one or more additional electronic components are selected from light emitting diodes (LEDs), sensors, transducers, thin-film batteries, capacitors, resistors, microcontrollers, and any combination thereof.

11. The sheet material of claim 1, wherein the geometrically different corner of the sheet is configured to allow locating the sheet material in at least one stage for producing an RFID product.

12. The sheet material of claim 1, wherein a RFID product manufactured from the sheet material is selected from a card, a tag, a label, a sticker, a packaging and a bracelet.

13. The sheet material of claim 1, wherein the sheet of material is formed in a sandwich structure, comprising:
a first printing layer;
a first layer of synthetic plastic adhesive on top of the first printing layer;
a substrate layer on top of the first layer of synthetic plastic adhesive, the substrate layer comprising the antenna, the chip being mounted on the antenna;
a second layer of synthetic plastic adhesive on top of the substrate layer, the second layer of synthetic plastic adhesive encapsulating the chip; and
a second printing layer on top of the second layer of synthetic plastic adhesive.

14. The sheet material of claim 13, wherein each of the first and second printing layers is selected from offset paper, craft paper, recycled paper, cardboard, synthetic paper, Polyethylene terephthalate, Polyvinyl chloride, Polypropylene, Polyethylene, natural fabric, synthetic fabric, and a combination thereof.

15. The sheet material of claim 1, wherein a plurality of RFID products are manufactured from the sheet material, each RFID product including the chip and at least one antenna.

16. The sheet material of claim 1, wherein:
a machine-readable bar code, QR code or graphic element is printed on the sheet material; and
one or more RFID product manufactured from the sheet material is identified by the machine-readable bar code, QR code or graphic element.

17. A method for manufacturing a radio frequency identification (RFID) product, comprising:
providing a sheet material, the sheet material comprising:
a rectangular sheet including:
a layer for printing,
an antenna, placed inside the sheet, and
a chip, placed inside the sheet,
wherein one corner of the sheet is geometrically different from three other corners of the sheet, the geometrically different corner being rounded; and
a plurality of positional elements located inside the sheet, the positional elements being usable for locating a plurality of RFID products during an operation selected from printing, cutting, and punching of the sheet material,
a thickness of the sheet material varying between 0.15 mm and 1.0 mm according to locations of the plurality of positional elements; and
mounting the sheet material into a printer, the geometrically different corner of the sheet being used for proper positioning of the sheet material in the printer.

* * * * *